US012057116B2

(12) United States Patent
Rodriguez et al.

(10) Patent No.: US 12,057,116 B2
(45) Date of Patent: Aug. 6, 2024

(54) INTENT DISAMBIGUATION WITHIN A VIRTUAL AGENT PLATFORM

(71) Applicant: salesforce.com, inc., San Francisco, CA (US)

(72) Inventors: Juan Rodriguez, Mountain View, CA (US); Michael Machado, Burlingame, CA (US)

(73) Assignee: Salesforce, Inc., San Francisco, CA (US)

( * ) Notice: Subject to any disclaimer, the term of this patent is extended or adjusted under 35 U.S.C. 154(b) by 125 days.

(21) Appl. No.: 17/162,007

(22) Filed: Jan. 29, 2021

(65) Prior Publication Data

US 2022/0246144 A1    Aug. 4, 2022

(51) Int. Cl.
*G10L 15/22*  (2006.01)
*G06F 9/451*  (2018.01)
*G10L 15/26*  (2006.01)
*G10L 15/32*  (2013.01)

(52) U.S. Cl.
CPC .............. *G10L 15/22* (2013.01); *G06F 9/453* (2018.02); *G10L 15/26* (2013.01); *G10L 15/32* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,801,730 B1* | 9/2010 | Miyazaki | H04L 12/40117 704/275 |
| 9,275,637 B1* | 3/2016 | Salvador | G10L 15/06 |
| 9,368,105 B1* | 6/2016 | Freed | G10L 15/22 |
| 9,691,378 B1* | 6/2017 | Meyers | G10L 21/028 |
| 9,691,395 B1* | 6/2017 | Sieracki | G10L 17/04 |
| 9,728,188 B1* | 8/2017 | Rosen | G10L 25/51 |
| 9,940,949 B1* | 4/2018 | Vitaladevuni | G10L 25/78 |
| 10,475,449 B2* | 11/2019 | Lang | G06F 3/165 |
| 11,393,456 B1* | 7/2022 | Guo | G10L 15/063 |
| 11,501,757 B2* | 11/2022 | Shim | G06N 3/08 |
| 2002/0135618 A1* | 9/2002 | Maes | G10L 15/24 715/767 |
| 2009/0164113 A1* | 6/2009 | Kang | G01C 21/3608 701/443 |

(Continued)

*Primary Examiner* — Seong-Ah A Shin
(74) *Attorney, Agent, or Firm* — Sterne, Kessler, Goldstein & Fox P.L.L.C.

(57) ABSTRACT

The present disclosure is directed techniques for executing a task or service using a virtual agent. A method includes: executing, using a virtual agent, one or more tiers of a plurality of tiers of machine learning analysis to identify a desired action to be performed based on a user command, the user command being received from an external computing device; responsive to the one or more tiers of the plurality of tiers of machine learning analysis identifying a plurality of actions associated with the user command, determining a series of inquiries to present via the external computing device, wherein each inquiry of the series of inquiries is selected based on a number of actions associated with each inquiry, and wherein each subsequent inquiry in the series of inquires is based on a user response to a preceding inquiry; identifying, based on responses to the series of inquiries, the desired action to be performed; and executing the desired action to be performed.

14 Claims, 3 Drawing Sheets

(56) References Cited

U.S. PATENT DOCUMENTS

| | | | | |
|---|---|---|---|---|
| 2012/0022872 | A1* | 1/2012 | Gruber | G06F 40/35 704/270.1 |
| 2019/0051297 | A1* | 2/2019 | Knudson | G10L 15/22 |
| 2020/0090646 | A1* | 3/2020 | Smith | G10L 15/22 |
| 2020/0111480 | A1* | 4/2020 | Hague | G10L 15/22 |
| 2020/0302924 | A1* | 9/2020 | Andreica | G06N 3/08 |
| 2020/0312298 | A1* | 10/2020 | Bui | G06F 3/167 |
| 2020/0327895 | A1* | 10/2020 | Gruber | G10L 17/22 |
| 2021/0117479 | A1* | 4/2021 | Liu | G06F 40/205 |
| 2021/0142189 | A1* | 5/2021 | Subramanya | G10L 15/22 |
| 2021/0201238 | A1* | 7/2021 | Sekar | G10L 15/1815 |
| 2021/0232589 | A1* | 7/2021 | Nelson | G06F 40/274 |
| 2021/0407520 | A1* | 12/2021 | Neckermann | G10L 17/16 |
| 2022/0067767 | A1* | 3/2022 | Carbune | H04L 67/303 |
| 2022/0148580 | A1* | 5/2022 | Kumar | G06F 18/29 |
| 2022/0238116 | A1* | 7/2022 | Gao | G10L 17/14 |

* cited by examiner

INTENT DISAMBIGUATION WITHIN A VIRTUAL AGENT PLATFORM

BACKGROUND

A virtual agent is an artificial intelligence (AI) element that provides customer services to a user. For example, a virtual agent may be a software agent that can perform tasks or services for the user based on verbal commands or questions. In some implementations, a user may ask the virtual agent questions, control home automation devices and media playback devices, and manage other tasks, e.g., manage emails, to-do lists, calendars, or the like. However, these tasks or services are pre-defined by an administrator of the virtual agent and are thus static in nature. Consequently, the user is beholden to the tasks or services that are pre-defined by the administrator.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to a virtual agent that may autonomously define custom intents. An intent may be a general description of a desired action, e.g., "create an event," "log an event," or the like. In some embodiments, the virtual agent of the present disclosure may analyze information from an application operating on a device or metadata associated with the user, i.e., privacy rights of the user, a role of the user, a history of actions previously taken by the user, or the like, and based on this information, the virtual agent may define the custom intents at run-time. In operation, the virtual agent may receive an input string associated with a user command from the user and determine a likely-performed-action from among the custom intents using a plurality of machine learning processes.

Figure 1:
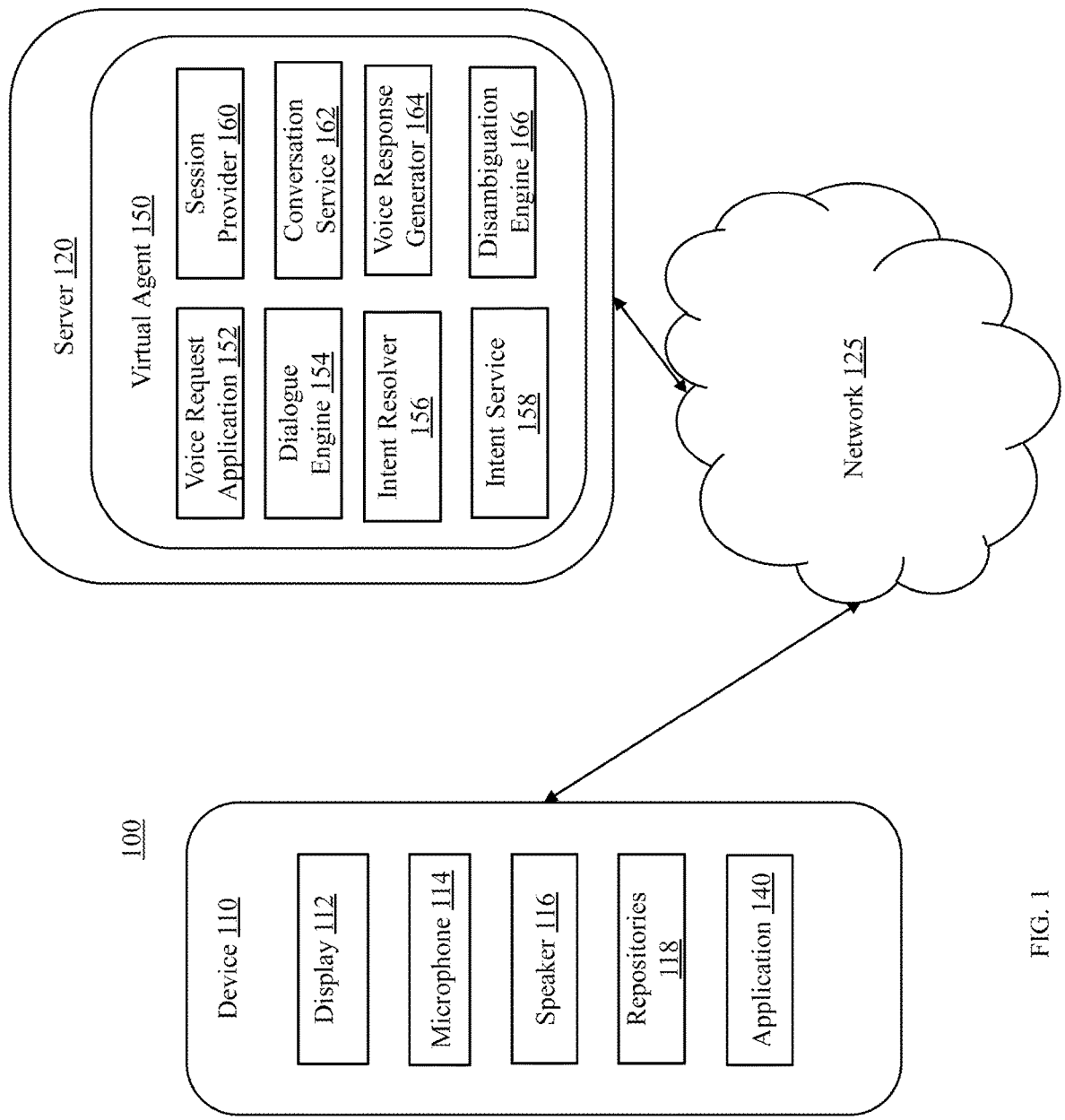
FIG. 1 is a block diagram of a system, according to some example embodiments.

FIG. 1 is a diagram of an example environment 100 in which example systems and/or methods may be implemented. As shown in FIG. 1, environment 100 may include a device 110, a server 120, and a network 125. Devices of the environment 100 may interconnect via wired connections, wireless connections, or a combination of wired and wireless connections. Devices of environment 100 may include a computer system 300 shown in FIG. 3, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the device 110 may be, for example, a mobile phone (e.g., a smart phone, a radiotelephone, etc.), a handheld computer, tablet, a laptop, a gaming device, a wearable communication device (e.g., a smart wristwatch, a pair of smart eyeglasses, etc.), or a similar type of device that is configured to operate an application, such as an application 140.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The server 120 may include a server device (e.g., a host server, a web server, an application server, etc.), a data center device, or a similar device, capable of communicating with the computing device 110 via the network 125.

In some embodiments, the device 110 may include a display 112, a microphone 114, a speaker 116, and one or more repositories 118. In some embodiments, the microphone 114 may be used to receive an audio input from a user. The audio input may be associated with the user command for one or more tasks or services, also referred to as an action. The one or more tasks or services may be, for example, a force function request. In some embodiments, the force function request may include a task oriented request, e.g., scheduling new events, creating a new contact, navigating to a particular location of a document, or the like. The audio input may be transmitted from the device 110 to the server 120 over the network 125

In some embodiments, in response to receiving the audio input form the device 110, the server 120 may process the audio input using a virtual agent 150 to execute the one or more tasks requested by the user. To achieve this, the virtual agent 150 may include a voice request application 152. The voice request application 152 may be configured to receive and process the audio input. In some embodiments, the voice request application 152 may operate independent of the virtual agent 150. For example, the voice request application 152 may operate on the same server 120 as the virtual agent, or the voice request application 152 may operate on a separate server and transmit the processed audio signal to the server 120 hosting the virtual agent 150. In some embodiments, the virtual agent 150, including the voice request application 152, may operate on the device 110.

The voice request application 152 may convert the user command into a received input string. For example, the voice request application 152 may convert the user command to the received input string using speech-to-text capabilities. In some embodiments, the voice request application 152 may include language translation capabilities, such that the user command may be translated into a different language as a text query. The text query may include the text-translation of the spoken word received from the user. For example, the user command may be "new appointment," and the voice request application 152 may parse the user command input into the received input string, including "new appointment." That is, the received input string may be a transcription of the user's spoken word.

The voice request application 152 may be executed by being activated in response to receiving an input from the user. For example, the voice request application 152 may be activated by receiving an audible command. In response to activating the voice request application 152, the user may provide the user command using the microphone 114, which may be transmitted to the voice request application 152. For example, the user may audibly state, "Please schedule my next appointment." The microphone 114 may capture the user command, and in turn, the device 110 may transmit the user command to the server 120. Upon receipt, the voice request application 152 may convert the command into the received input string and transmit the received input string to a dialogue engine 154 of the virtual agent 150. In some embodiments, the dialogue engine 154 may be executed as an API that is called upon by the server 120. Alternatively, in some embodiments, the dialogue engine 154 may be executed as an API that is called upon by the application 140 operating on the device 110 or may be integrated within the application 140 as an API.

In some embodiments, the virtual agent 150 may process the received input string and execute an action based on the user command. To do so, in some embodiments, the virtual agent 150 may include a session provider 160, which is used to store a session when the user interacts with the virtual agent 150. The session provider 160 may determine whether a session on the virtual agent 150 exists. In the event that the session does not exist, the dialogue engine 154 may create a new session with one or more intents provided by an intent service 158 of the virtual agent 150. In other words, in some embodiments, the intent service 158 may define the one or more intents available for the new session at the time the session is created, i.e., the one or more intents may be dynamic intents defined at run-time. In the event that the session exists, the dialogue engine 154 may use the one or more intents present on the existing session. In some embodiments, the one or more intents may be modified by the intents themselves. Each session may include the intents, a session identification (ID), which may be set by the user, and context information, where values for intent parameters may be stored.

In some embodiments, the one or more intents available for the existing session or the new session may be based on information from the application 140 associated with the session or metadata associated with the user, i.e., privacy rights of the user, a role of the user, a history of actions previously taken by the user, or the like. Furthermore, in some embodiments, the session provider 160 may contain the one or more intents, as well as any context data used by a dialogue engine 154. In some embodiments, the intents may include, but are not limited to, read, create, or update. It should be understood by those of ordinary skill in the arts that these are merely examples of intents and that other intents are further contemplated in accordance with aspects of the present disclosure.

In some embodiments, the one or more intents may include a plurality of elements. For example, the plurality of elements may include an intent name, a plurality of parameters, one or more messages, an input context, and an output context.

The name may be, for example, a description of the intent. For example, the name may be "create event," "update contact," "log event," "generic read," or the like. It should be understood by those of ordinary skill in the art these are merely examples of names and that other names are further contemplated in accordance with aspects of the present disclosure.

The one or more parameters may include, but are not limited to, a parameter identification (ID), type, a name, a value associated with the name, a system definition, one or more required values, and/or a prompt. The parameter ID may be generated by the device 110 or the server 120.

In some embodiments, the one or more messages may be a response provided to the user. For example, the message may be a confirmation message that the action was completed, an acknowledgement, e.g., "thank you" or "okay," or an indication that the action could not be completed.

The input context may be contextual information for executing an action associated with the user command provided by a user. For example, in order to create a new contact, the input context may be that the user should be logged into a personal account that grants access to an address book of the user. As another example, in order to create a new appointment, the input context may be that the user should be logged into a personal account that grants access to a calendar of the user. It should be understood by those of ordinary skill in the art that these are merely examples of input context and that other input contexts are contemplated in accordance with aspects of the present disclosure. In some embodiments, when the input context requires action by the user, e.g., logging into an account, the user may be prompted to perform such action.

The output context may be an output of executing the action associated with the intent. For example, the output context may be a new contact created in the user's address book or a new appointment scheduled on the user's calendar.

As one example, an intent may be "schedule a meeting on [[meeting_date]]." In this example, the intent has one parameter with a parameter ID "meeting_date," a type "datetime," a required value of "true," and a prompt "please enter the date for your meeting." In this example, the user command may be "I want to schedule a meeting on Jan. 1, 2021," with session ID "session_id_xyz." Upon receiving the request, the dialogue engine 154 may determine that this is the first request with the session ID "session_id_xyz," i.e., there is no session associated with the session ID "session_id_xyz." In response, the dialogue engine 154 may create a new session containing the intent "schedule a meeting on [[meeting_date]]" provided by the intent service 158.

In some embodiments, the virtual agent 150 may also include a voice response generator 164. The voice response generator 164 may generate verbal responses for the user. For example, voice response generator 164 may generate a verbal response that is transmitted to the device 110, which in turn may provide the user with audio via the speaker 116. The verbal response may include, for example, a welcome message to the user. For example, the welcome message may be "How can I help you today?" or the like. It should be understood by those of ordinary skill in the art that this is merely an example welcome message and that other welcome messages are further contemplated in accordance with aspects of the present disclosure. For example, other welcome messages may indicate which intents are available to the user or what are the most frequently used intents. In this way, the welcome message may be open-ended, i.e., a generic message, or close-ended, i.e., specifying specific intents to the user.

In some embodiments, the dialogue engine 154 may process the received input string to select an intent from the available intents for a given session and execute an action associated with the selected intent, as discussed in co-pending U.S. patent application Ser. No. 17/162,003, titled "Automatic Intent Generation Within A Virtual Agent Platform," filed on Jan. 29, 2021, the contents of which are hereby incorporated by reference. For example, the dialogue engine 154 may determine an action to be taken by executing a plurality of tiers of machine learning analysis on the received input string, In some embodiments, one or more of the plurality of tiers of machine learning analysis may identify a plurality of actions associated with the user command. For example, the user command may include "Find a record for Michael," and the dialogue engine 154 may identify tens, hundreds, or even thousands of such "records," and as such, the dialogue engine 154 may not be able to determine which action to execute.

In response to identifying the plurality of actions associated with the user command, a context disambiguation engine 166 of the virtual agent 150 may be configured to determine a series of inquiries to present to the user the device 110. In some embodiments, each inquiry may include a plurality of options for responding to the inquiry. For example, the plurality of options may include between two (2) and five (5) options. It should be understood by those of ordinary skill in the art that these are merely an example number of options presented to the user and that more (or less) options may be presented to the user.

In some embodiments, the number of options included in the plurality of options may be based on a number of variables, such as a current usage setting of the device 110 or a user profile. The current usage setting may be, for example, operating the device 110 while in a vehicle versus operating the device 110 while stationary, or interacting with the virtual agent 150 using audio only versus using a combination of audio and a visual display. For example, for the current usage setting, fewer options may be presented to the user while operating the device 110 in the vehicle so as to allow the user to focus on operating the vehicle or when using audio only so the user is not overwhelmed by the number of options. In contrast, more options may be presented to the user when the user is stationary or using a combination of audio and the visual display. An another example, for the user profile, the number of options may be being tailored based on whether the user profile indicates a user preference, e.g., more accurate results by using more questions with a few number of options or faster results by using fewer questions with a greater number of options, a user role, a user's organization, or the like.

In some embodiments, the voice response generator 164 may transmit the plurality of options to the device 110, which may, in turn, provide the plurality of options to the user via the speaker 116. In some embodiments, the virtual agent 150 may transmit the plurality of options to the device 110 in manner that the device 110 may display the plurality of options on the display 112.

The plurality of options presented to the user may include a combination of substantive options and a null option. In some embodiments, the null option may include, but is not limited to, "none of the above," "go back," "cancel," or the like. In some embodiments, in the event that the user selects the null option of "none of the above," the disambiguation engine 166 may present the same inquiry with a new set of plurality of options similarly including a new combination of substantive options and the null option until the same question is repeated a limited number of iterations. As one example, the number of iterations the same inquiry may be repeated is three (3). It should be understood by those of ordinary skill in the art that this is merely an example and that other limits are contemplated in accordance with aspects of the present disclosure. In the event the user selects "none of the above" on a final iteration, the disambiguation engine 166 may determine that more information may be required from the user. For example, in some embodiments, the disambiguation engine 166 may request more information from the user using the voice response generator 164 or via text displayed on the device 110. In some embodiments, rather than repeating the same inquiry to the user in response to the user selecting the null option, the disambiguation engine 166 may select a new inquiry to present to the user.

In some embodiments, in the event that the user selects the null option of "go back," the disambiguation engine 166 may repeat a most recent previous inquiry. In doing so, the disambiguation engine 166 may present the most recent previous inquiry with a same set of options, a similar set options with a previously selected option being replaced and the other options being the same, or a completely new set of options.

In some embodiments, in the event that the user selects the null option of "cancel," the disambiguation engine 166 may cancel a request of the user command.

In some embodiments, the disambiguation engine 166 may rank the plurality options. For example, the plurality of options may be ranked based on a number of results associated with each option, with options having a higher number of results being ranked higher. The plurality of options presented to the user may be based on such ranking, with the highest ranking options being presented to the user. In the event that a second set of plurality of options is presented to the user, the second set of plurality of options may include the next highest ranking options, and so on.

In some embodiments, the disambiguation model 166 may select each inquiry of the series of inquiries based on a number of actions associated with each inquiry. For example, each inquiry of the series of inquiries may be selected based on which inquiry yields a fewest number of actions. In some embodiments, selecting the inquiry may be achieved using, for example, a support vector machine algorithm, as should be understood by those of ordinary skill in the art. In some embodiments, selecting the inquiry may be based on a standard deviation of the number of options associated with each of the plurality of inquiries. For example, selecting the inquiry based on the standard deviation may be based on the standard deviation of the number of options plus an absolute value a difference between a maximum number of options minus a number of actions. In this example, the disambiguation engine 166 may select an inquiry with the lowest value.

In some embodiments, each subsequent inquiry in the series of inquires is based on a user response to a preceding inquiry. For example, in response to receiving a response to an inquiry, the disambiguation engine 166 may filter out actions that are unassociated with the selected option and select a next inquiry based on actions that are associated with the selected option. Using "Find a record for Michael" as an example, the disambiguation engine 166 may present a first inquiry of "Is Michael an employee of: 1) Company A; 2) Company B; or 3) Company C," and in response to the user selecting "Company A," the disambiguation engine 166 may present the next inquiry limiting the options that are relevant to "Company A," while filtering out options that are relevant to "Company B" and "Company C." For example, "Company A" may have offices in different cities, states, or countries, or may have different divisions, etc., and the disambiguation engine 166 may determine which inquiry to present next based on such information.

In some embodiments, a number of inquiries in the series of inquiries may be limited. For example, the disambiguation engine 166 may present up to six (6) inquiries to the user. It should be understood by those of ordinary skill in the art that this is merely an example and that any number of inquiries can be presented to the user. In the event that the disambiguation engine 1166 does not identify a request task within the limit, the disambiguation engine 166 may request additional information from the user using the voice response generator 164 or via text displayed on the device 110, notify the user that it was unable to identify the requested action and request that the user start over, or present both options to the user.

In some embodiments, the disambiguation engine 166 may identify, based on responses to the series of inquiries, the desired action to be performed and an intent resolver 156 of the virtual agent 150 may be configured to execute the action associated with the user command accordingly. Continuing with the "Find a record" example, the disambiguation engine 166 may identify the particular record that the user was looking for based on the responses to the series of inquiries and the intent resolver 156 may retrieve the record.

Figure 2:
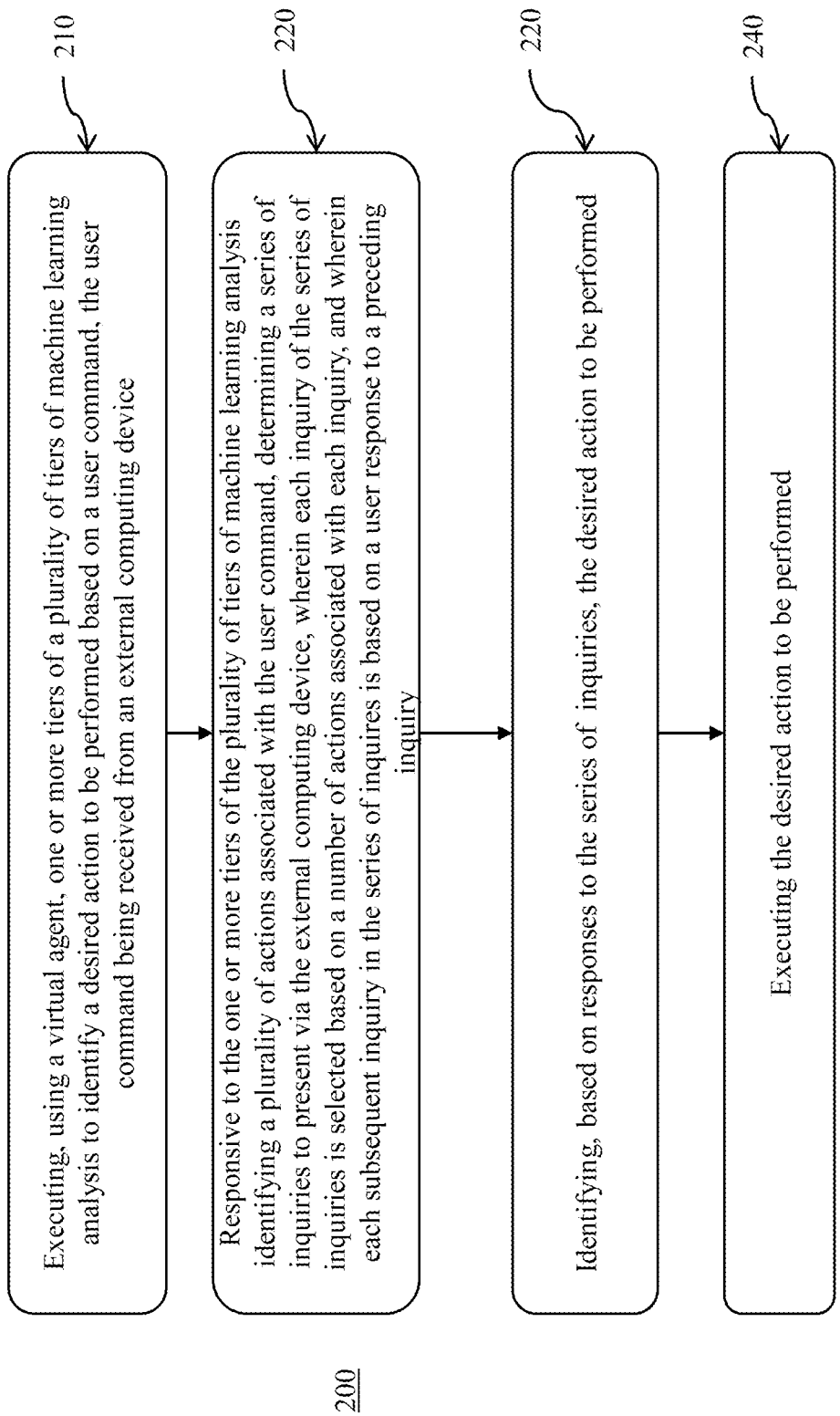
FIG. 2 is a flowchart illustrating a process for executing, on a computing platform, an action based on a user command, according to some example embodiments.

FIG. 2 is a flow chart of an example method 200 for executing, on a computing platform, an action based on a user command. In some embodiments, one or more processes described with respect to FIG. 2 may be performed by the server 120 of FIG. 1.

At 210, the method 200 may include executing, using a virtual agent (e.g., virtual agent 150 of FIG. 1), one or more tiers of a plurality of tiers of machine learning analysis to identify a desired action to be performed based on a user command. In some embodiments, the user command may be obtained by the microphone 114 of device 110 and transmitted to the server 120, i.e., the user command may be received from an external computing device.

At 220, the method 200 may include, responsive to the one or more tiers of the plurality of tiers of machine learning analysis identifying a plurality of actions associated with the user command, determining a series of inquiries to present via the external computing device, e.g., device 110. In some embodiments, each inquiry of the series of inquiries may be selected based on a number of actions associated with each inquiry and each subsequent inquiry in the series of inquires is based on a user response to a preceding inquiry. In some embodiments, the plurality of actions associated with the user command may include tens, hundreds, or thousands of actions.

At 230, the method 200 may include identifying, based on responses to the series of inquiries, the desired action to be performed.

At 240, the method 200 may include executing, using the virtual agent, the desired action to be performed.

Figure 3:
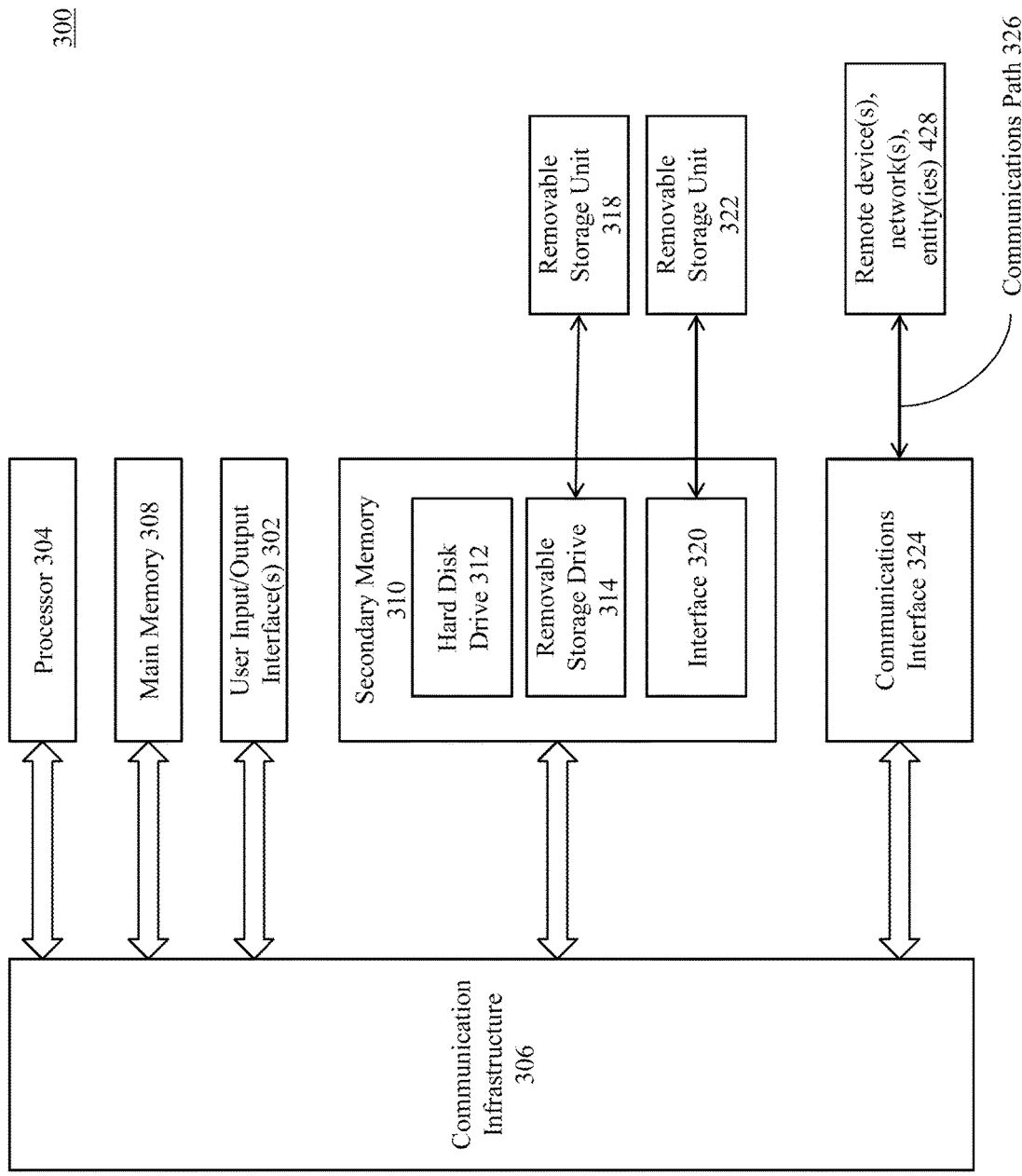
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318.

Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A method, comprising:
   executing, using a virtual agent, one or more tiers of a plurality of tiers of machine learning analysis to identify a desired action to be performed based on a user command, the user command being received from an external computing device;
   responsive to the one or more tiers of the plurality of tiers of machine learning analysis identifying a plurality of actions associated with the user command, determining a series of inquiries to present via the external computing device, wherein a first inquiry of the series of inquiries comprises a first plurality of options presented to a user, wherein a second inquiry in the series of inquires comprises a second plurality of options, wherein the first plurality of options comprise a combination of substantive options and a null option, wherein the second plurality of options comprise a new set of substantive options responsive to receiving a selection of the null option, and wherein each of the first inquiry and the second inquiry is selected based on a number of actions associated with the corresponding inquiry;
   identifying, based on responses to the series of inquiries, the desired action to be performed; and
   executing the desired action to be performed.

2. The method of claim 1, wherein a number of options presented in the first and second plurality of options presented to the user is based on a current usage setting of the external computing device or a user profile.

3. The method of claim 1, wherein a number of options presented in the first plurality of options presented to the user is between two and five options.

4. The method of claim 1, wherein determining the series of inquiries to present via the external computing device comprises selecting an inquiry from among a plurality of inquiries that yields a fewest number of actions.

5. The method of claim 4, wherein selecting the inquiry from among the plurality of inquiries that yields the fewest number of actions is based on a standard deviation of a number of options associated with each of the plurality of inquiries.

6. A system, comprising:
   a memory; and
   a processor coupled to the memory and configured to:
      execute, using a virtual agent, one or more tiers of a plurality of tiers of machine learning analysis to identify a desired action to be performed based on a user command, the user command being received from an external computing device;
      responsive to the one or more tiers of the plurality of tiers of machine learning analysis identifying a plurality of actions associated with the user command, determine a series of inquiries to present via the external computing device, wherein a first inquiry of the series of inquiries comprises a first plurality of options presented to a user, wherein a second inquiry in the series of inquires comprises a second plurality of options, wherein the first plurality of options comprise a combination of substantive options and a null option, wherein the second plurality of options comprise a new set of substantive options responsive to receiving a selection of the null option, and wherein each of the first inquiry is selected based on a number of actions associated with the corresponding inquiry;

identify, based on responses to the series of inquiries, the desired action to be performed; and execute the desired action to be performed.

7. The system of claim 6, wherein a number of options presented in the first and second plurality of options presented to the user is based on a current usage setting of the external computing device or a user profile.

8. The system of claim 6, wherein a number of options presented in the first plurality of options presented to the user is between two and five options.

9. The system of claim 6, wherein, to determine the series of inquiries to present via the external computing device, the processor is further configured to select an inquiry from among a plurality of inquiries that yields a fewest number of actions.

10. The system of claim 9, wherein selecting the inquiry from among the plurality of inquiries that yields the fewest number of actions is based on a standard deviation of a number of options associated with each of the plurality of inquiries.

11. A non-transitory computer-readable device having instructions stored thereon that, when executed by at least one computing device, cause the at least one computing device to perform operations comprising:

executing, using a virtual agent, one or more tiers of a plurality of tiers of machine learning analysis to identify a desired action to be performed based on a user command, the user command being received from an external computing device;

responsive to the one or more tiers of the plurality of tiers of machine learning analysis identifying a plurality of actions associated with the user command, determining a series of inquiries to present via the external computing device, wherein a first inquiry of the series of inquiries comprises a first plurality of options presented to a user, wherein a second inquiry in the series of inquires comprises a second plurality of options, wherein the first plurality of options comprise a combination of substantive options and a null option, wherein the second plurality of options comprise a new set of substantive options responsive to receiving a selection of the null option, and wherein each of the first inquiry and the second inquiry is selected based on a number of actions associated with the corresponding inquiry;

identifying, based on responses to the series of inquiries, the desired action to be performed; and executing the desired action to be performed.

12. The non-transitory computer-readable device of claim 11, wherein a number of options presented in the first and second plurality of options presented to the user is based on a current usage setting of the external computing device or a user profile.

13. The non-transitory computer-readable device of claim 11, wherein determining the series of inquiries to present via the external computing device comprises selecting an inquiry from among a plurality of inquiries that yields a fewest number of actions.

14. The non-transitory computer-readable device of claim 13, wherein selecting the inquiry from among the plurality of inquiries that yields the fewest number of actions is based on a standard deviation of a number of options associated with each of the plurality of inquiries.

* * * * *

UNITED STATES PATENT AND TRADEMARK OFFICE
CERTIFICATE OF CORRECTION

PATENT NO. : 12,057,116 B2  
APPLICATION NO. : 17/162007  
DATED : August 6, 2024  
INVENTOR(S) : Rodriguez et al.

Page 1 of 1

It is certified that error appears in the above-identified patent and that said Letters Patent is hereby corrected as shown below:

In the Drawings

On Sheet 2 of 3, FIG. 2, and on the title page, the illustrative print figure, in the second Tag 220 from the left, delete "220" and insert --230--, therefor.

Signed and Sealed this  
First Day of April, 2025

Coke Morgan Stewart  
*Acting Director of the United States Patent and Trademark Office*